US 6,684,027 B1

(12) United States Patent
Rosenberg

(10) Patent No.: US 6,684,027 B1
(45) Date of Patent: Jan. 27, 2004

(54) METHOD AND SYSTEM FOR RECORDING DATA FOR THE PURPOSES OF PERFORMANCE RELATED SKILL DEVELOPMENT

(76) Inventor: Joan I. Rosenberg, 5506 Ranchito Ave., Sherman Oaks, CA (US) 91401

( * ) Notice: Subject to any disclaimer, the term of this patent is extended or adjusted under 35 U.S.C. 154(b) by 0 days.

(21) Appl. No.: 09/379,145

(22) Filed: Aug. 19, 1999

(51) Int. Cl.[7] .................. H04N 5/76; H04N 7/00; G11B 27/00
(52) U.S. Cl. .................. 386/117; 386/52; 386/46
(58) Field of Search ............... 386/117, 107, 386/108, 46–52, 54, 4, 38, 39, 81; 360/32; 434/247, 257, 258; G11B 27/00; H04N 5/76, 7/00

(56) References Cited

U.S. PATENT DOCUMENTS 4,459,114 A  *  7/1984  Barwick
5,333,061 A  *  7/1994  Nakashima et al.
5,868,578 A  *  2/1999  Baum

* cited by examiner

Primary Examiner—Robert Chevalier
(74) Attorney, Agent, or Firm—Blakely Sokoloff Taylor & Zafman LLP

(57) ABSTRACT

A system and method for enhancing skill development through review of an event. In one embodiment, the method comprises providing captured video related to the training session to a first input port of a recording system. Next, alphanumeric text input by at least one observer of the event to a second input port of the recording system. Thereafter, a combination of the captured video and alphanumeric text contemporaneously with the video is recorded on a selected medium.

11 Claims, 4 Drawing Sheets

METHOD AND SYSTEM FOR RECORDING DATA FOR THE PURPOSES OF PERFORMANCE RELATED SKILL DEVELOPMENT

BACKGROUND

1. Field

The present invention generally relates to the field of multimedia. More specifically, the present invention relates to a system and method for recording a combination of both captured video of an event and data input from one or more observers of the event for the purpose of enhancing the development of performance related skills.

2. General Background

For many years, instructors have used a variety of teaching techniques to improve inter-personal and analytical diagnostic skills of their trainees. For example, for collegiate studies in psychology, instructors normally conduct clinical training sessions in order to refine communication and diagnostic skills of their trainees. An instructor supervises the "live" session and either (i) prepares handwritten comments for discussion with the trainee at a later time, or (ii) interrupts the trainees to provide feedback in real-time.

While real-time feedback normally enhances one's learning experience, it is highly disruptive to the pace of the session. Also, continued instructor interruptions allow any trainee observers to become disengaged from the session. This adversely affects the degree of learning of the individual trainee or of the observers watching training sessions conducted by others.

Recent efforts have been made to reduce the level of disruption caused by real-time feedback. In particular, instructors have begun to equip trainees with technological aids. For example, a trainee would be equipped with an ear piece through which audio feedback from the instructor is received. Alternatively, a teleprompter may be provided for the trainee to read written instructor feedback during the session. The use of technological aids has been found to be highly distracting and anxiety provoking because the trainee is forced to simultaneously consider competing inputs from the instructor and participant(s) of the clinical session. These inputs may be (i) competing audio or (ii) visual information competing with audio.

With the advent of affordable, portable video cameras, these cameras have been instrumental in documenting training sessions in an effort to improve communication skills of the trainees. The sessions are videotaped and the instructor normally takes notes during the session. This system, however, fails to provide any real-time feedback unless the instructor meets with the trainee. These meetings are time intensive to both the instructor and the trainee. Besides time issues, this videotaped technique is subject to many other disadvantages. For example, both instructors and trainees are sometimes unable to determine what segments of the videotaped session correspond to his or her handwritten notes. Also, generally, individuals are more able to learn from reinforcement or corrective feedback when both witnessing an event and receiving a critique, or critical and instructive feedback simultaneously.

It is contemplated that it would be advantageous to develop a system and method for enhancing skill development by providing a combination of video and real-time, instructional comments that neither disrupts a training session nor requires the presence of the instructor.

SUMMARY

A system and method for enhancing skill development through review of an event. In one embodiment, the method comprises providing captured video related to the training session to a first input port of a recording system. The alphanumeric text is input by at least one observer of the event to a second input port of the recording system. Thereafter, a combination of the captured video and alphanumeric text contemporaneously with the video is recorded on a selected medium. The selected medium can be viewed by the trainee at a later time and continue to provide real-time feedback qualities.

BRIEF DESCRIPTION OF THE DRAWINGS

The features and advantages of the present invention will become apparent from the following detailed description of the present invention in which.

DETAILED DESCRIPTION

The present invention relates to a system and method for enhancing skill development through real-time insertion of data within a video stream without disrupting an event being recorded or requiring continued presence of an instructor. However, it is apparent to one skilled in the art that the present invention may be practiced without the specific details set forth below.

In the following description, certain terminology is used to describe certain features of the present invention. More specifically, a "computer" is defined as hardware implemented with a processor and a video capture card such as All-in-Wonder Pro™ card manufactured by ATI Technologies, Inc. The computer may be employed as a laptop, a desktop, a hand-held, a server, a mainframe, and the like. A "recording device" is generally defined as any hardware capable of recording digital and/or analog information in a selected medium. For example, the medium may include a video cassette recorder (VCR) tape, a digital video disk, a compact disk, a floppy disk, a hard disk, and the like. The "information" may include data, address, control or any combination thereof. Examples of certain types of data include video, and/or alphanumeric text and/or audio.

Figure 1:
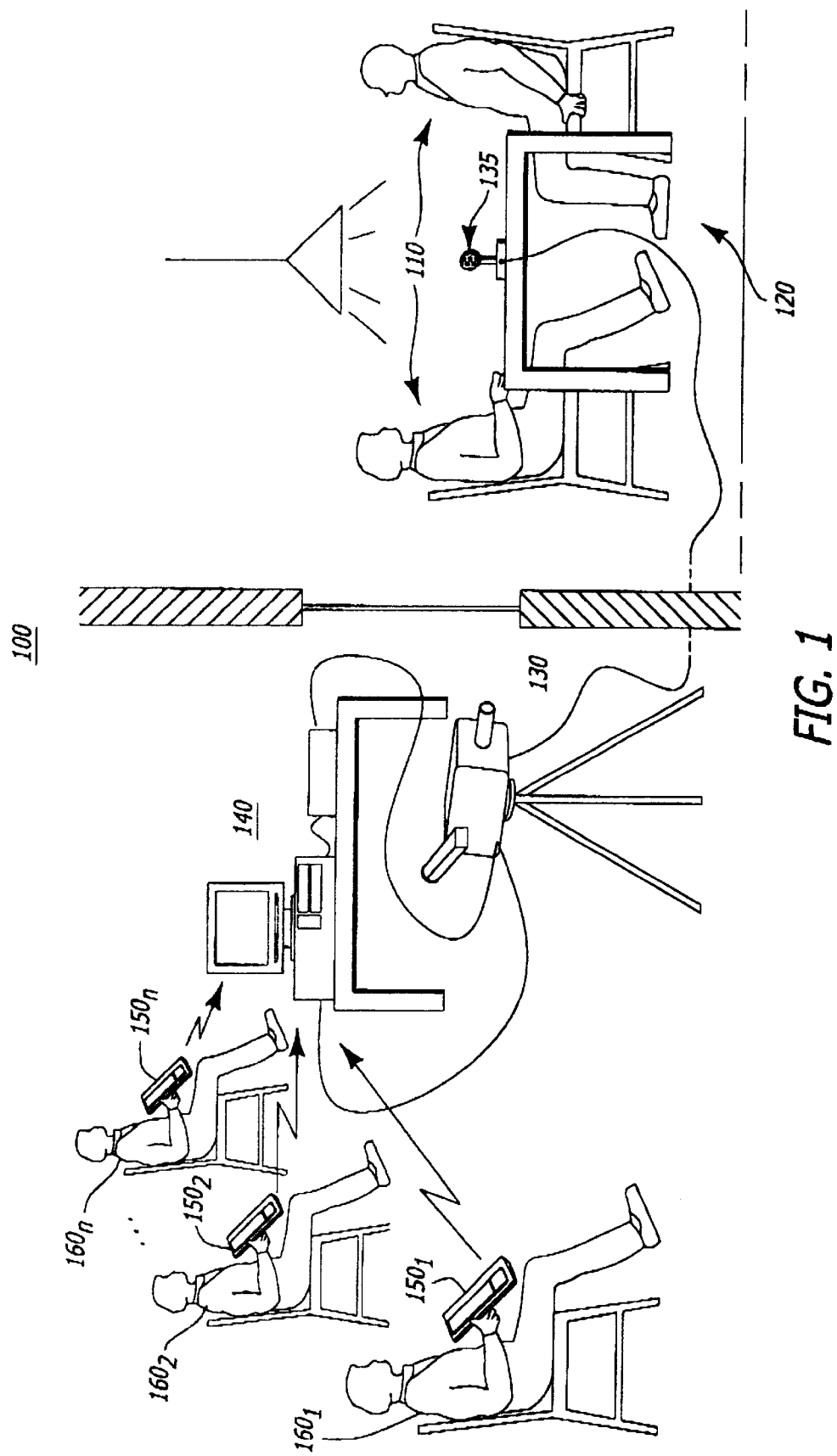
FIG. 1 is an illustrative embodiment of an event during which the present invention is used.

Referring to FIG. 1, an illustrative embodiment of an event 100 is shown in which trainees of the event are utilizing the present invention to improve one's skill level. For this embodiment, event 100 is a training session for any profession such as, for example, a physician-patient practice session, a rehearsal, a sport-related practice, an interview (as shown) and the like. Herein, event 100 involves one or more trainees 110 conducting an interview at a predetermined location 120. The content (e.g., video and/or audio) of event 100 is recorded by a first data capturing device 130 (e.g., a video camera) either concealed from trainees 110 as shown (e.g., hidden behind a two-way mirror) or situated in plain view by trainees 110. A second data capturing device (e.g., microphone) 135 is placed in close proximity to trainees 110. The recorded content (e.g., video and its corresponding audio) is provided to a recording system 140, which also is capable of receiving input from one or more input devices $150_1$–$150_n$ controlled by observers $160_1$–$160_n$ (where "n" is a positive whole number). As shown, input devices $150_1$–$150_n$ are wireless keyboards, which allow observers $160_1$–$160_n$ to input comments that will be recorded contemporaneously with the video.

Figure 2:
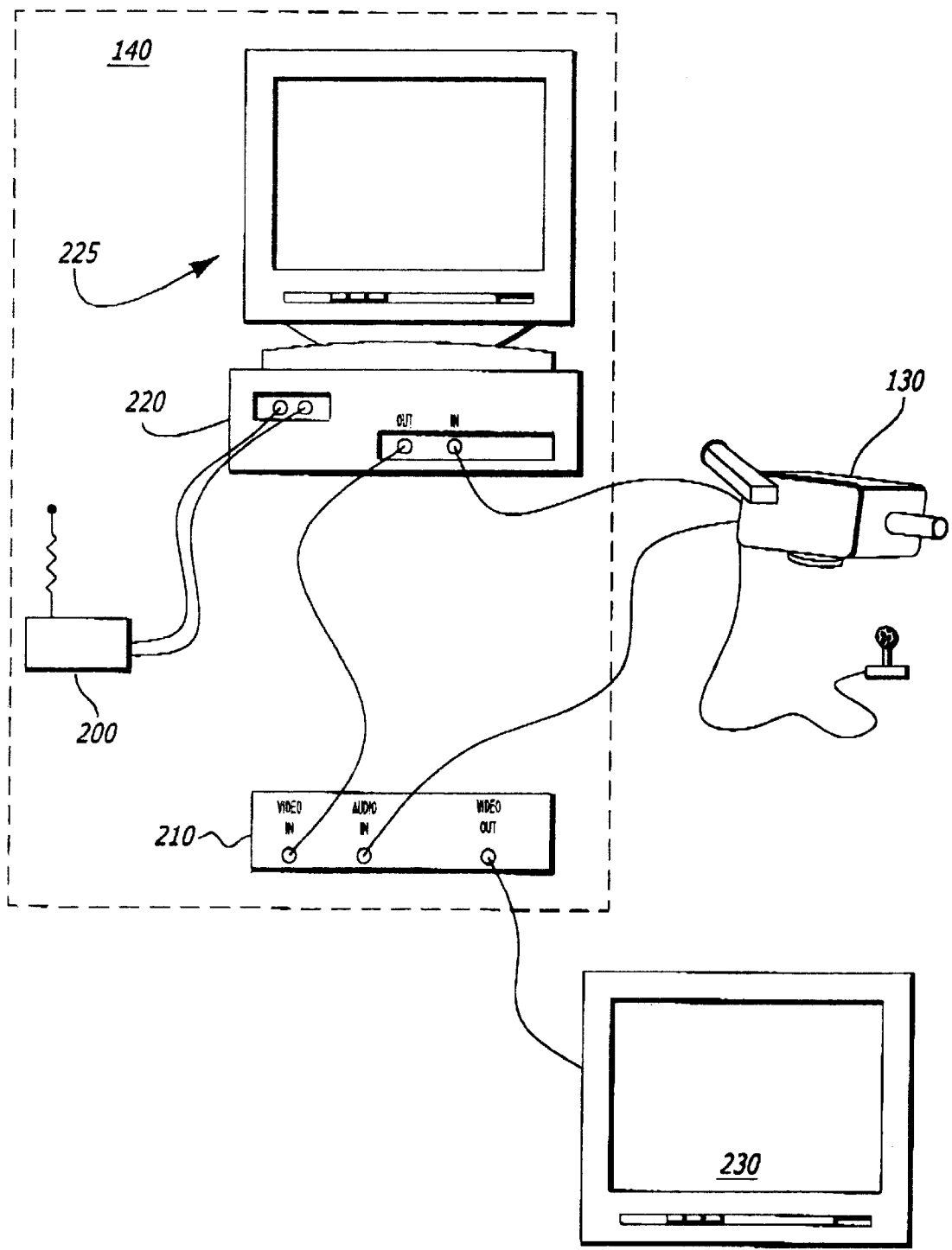
FIG. 2 is an illustrative embodiment of a recording system used during the event.

Referring now to FIG. 2, an illustrative embodiment of recording system 140 is shown. Recording system 140 comprises an optional receiver 200, a recording device 210 and a computer 220 inclusive of display 225. For this embodiment, receiver 200 is designed to receive information over wireless communications such as infrared, radio frequency, and the like. However, it is contemplated that receiver 200 may be removed in certain embodiments. For example, receiver 200 is not needed when an input device (e.g., keyboard $150_1$) is physically coupled via a cable to an input/output (I/O) port at the backplane of computer 220.

As shown in FIG. 2, computer 220 receives video from first data capturing device 130. In this embodiment, video is placed in a digital format before being downloaded to computer 220. Of course, first data capturing device 130 may be an analog video camera such that computer 200 performs the analog-to-digital conversion. Computer 220 includes a video capture card (not shown) that is coupled to a first communication port (IN) of computer 220. This allows the video capture card to receive video from first data capturing device 130. Under the control of a video capture application (e.g., ATI player version 5.0NT) running on computer 220, the downloaded video and any accompanying data is output through a second communication port (OUT) of computer 220 to recording device 210 for subsequent display on monitor 230. Herein, the audio corresponding to the video is directly downloaded to an audio input port of recording device 210.

Figure 3:
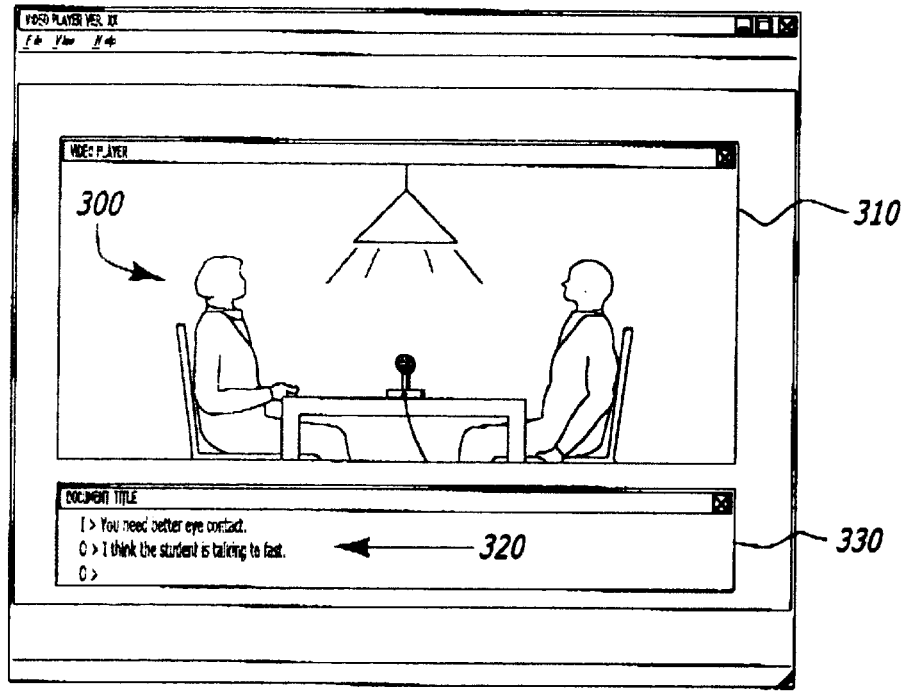
FIG. 3 is a first illustrative embodiment of the total recorded display inclusive of a window for video and a window for comments.

As shown in both FIGS. 2 and 3, video 300 is displayed in a window 310 controlled by the video capture application. In addition, alphanumeric text 320 may be displayed in a first comment window 330 under control of a Windows-based application such as Microsoft Word 97™ developed by Microsoft Corporation of Redmond, Wash. for example. Text 320 includes real-time comments from all observers $160_1$–$160_n$ (see FIG. 1) of the event. The comments are directed to content and process of the session in order to enhance skill development of the trainee. For example, the comments may include (1) feedback regarding physical mannerisms of the trainee, (2) feedback regarding the substantive content of discussions during the session, (3) feedback regarding verbal and non-verbal actions by the trainee during the session; (4) chronology of the session; (5) opinions on the diagnostic approach; (6) reactions of the observers; (7) questions to other observers to facilitate a forum for discussion, any other commentary. A macro program is loaded within computer 220 and its purpose is to identify the observer or group of observers who provided text 320.

For this embodiment, upon detecting an access request signal (e.g., control code) from an input device (e.g., depression of a predetermined function key <F2>of a wireless keyboard), the macro program places a prompt (e.g., "I>" as shown) signifying that the following comments are from a first group of observers (e.g., an instructor). A "group" is generally defined as one or more persons having the same status (e.g., instructor, trainee, etc.). Likewise, the macro program may be coded to detect another type of control code from an input device (e.g., depression of function key <F4>), and in response, places a prompt (e.g., "O>" as shown) signifying that the following comments are from a second group of observers (e.g., trainee observers).

In order to handle the situation where multiple observers are attempting to provide comments contemporaneously, it is contemplated that the macro program may be coded to only display comments originating from the observer who most recently requested access to computer 220. For this embodiment, only text from the observer who most recently depressed a particular function key would be received by computer 220. Alternatively, the macro program may be coded in accordance with a predetermined priority scheme with observers from the first group being assigned the highest priority. This would prevent an observer assigned to the first group from being interrupted by an observer of the second group having a lower priority.

Figure 4:
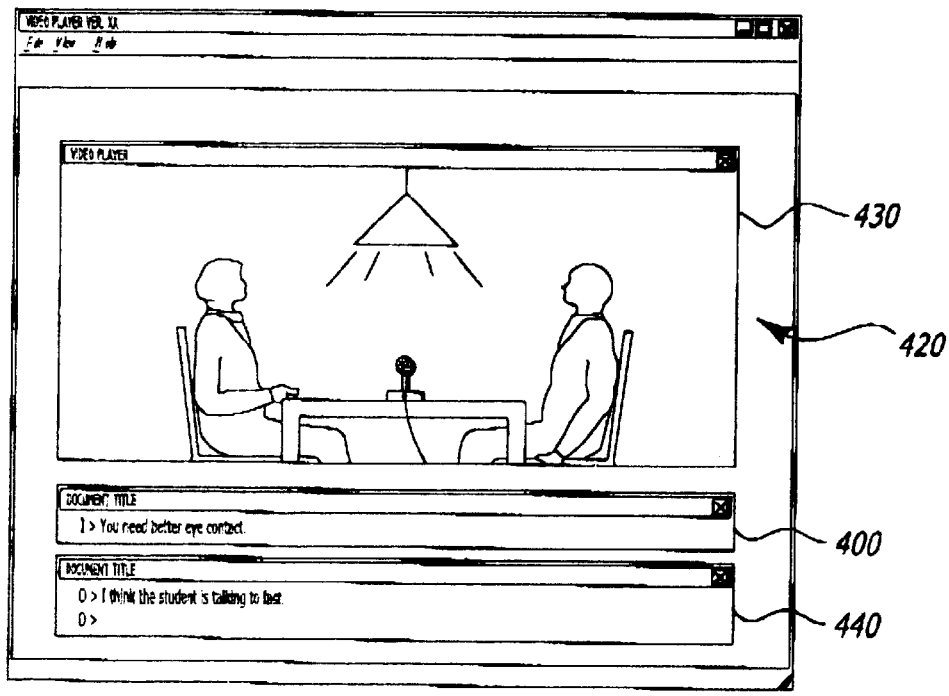
FIG. 4 a second illustrative embodiment of the total recorded display inclusive of a window for video and two or more windows for comments from different groups of observers.

Also, in lieu of using a single comment window, it is contemplated that multiple windows may be used to record comments from two or more observers as shown in FIG. 4. For example, the macro program may be coded to detect a selected access request signal from an input device controlled by an observer of a first group. Upon detection of the selected access request signal, data input from the observer is assigned to a first comment window 400. Likewise, the macro program may be coded to detect another selected access request signal, which would provide data input from one or more trainee observers for display in a second comment window 410. A total display 420, inclusive of comment windows 400 and 410 and a window 430 showing the captured video of the event, is transferred to recording device 210 of FIG. 2 for recordation with the audio.

Herein, referring back to FIG. 2, recording device 210 separately receives data from first data capturing device 130 and computer 220. In particular, for this embodiment, recording device 210 receives signaling associated with the total display, which includes both video 300 and text 320 from computer 220. Also, recording device 210 receives audio signaling from second data capturing device 135. Recording device 210 combines the audio along with video 300 and text 320 to re-create the viewable event featuring real-time comments concerning the event. The combined data is stored in a medium (e.g., VCR tape, DVD, CD, etc.) for later review by the observers or a trainee of the event without requiring the presence of the instructor. This review provides effective real-time feedback to develop various skills.

It is contemplated that the macro program may be configured to operate in accordance with a number of different configurations. These configurations are tailored to improve and further develop one or more given skills of a trainee.

Figure 5:
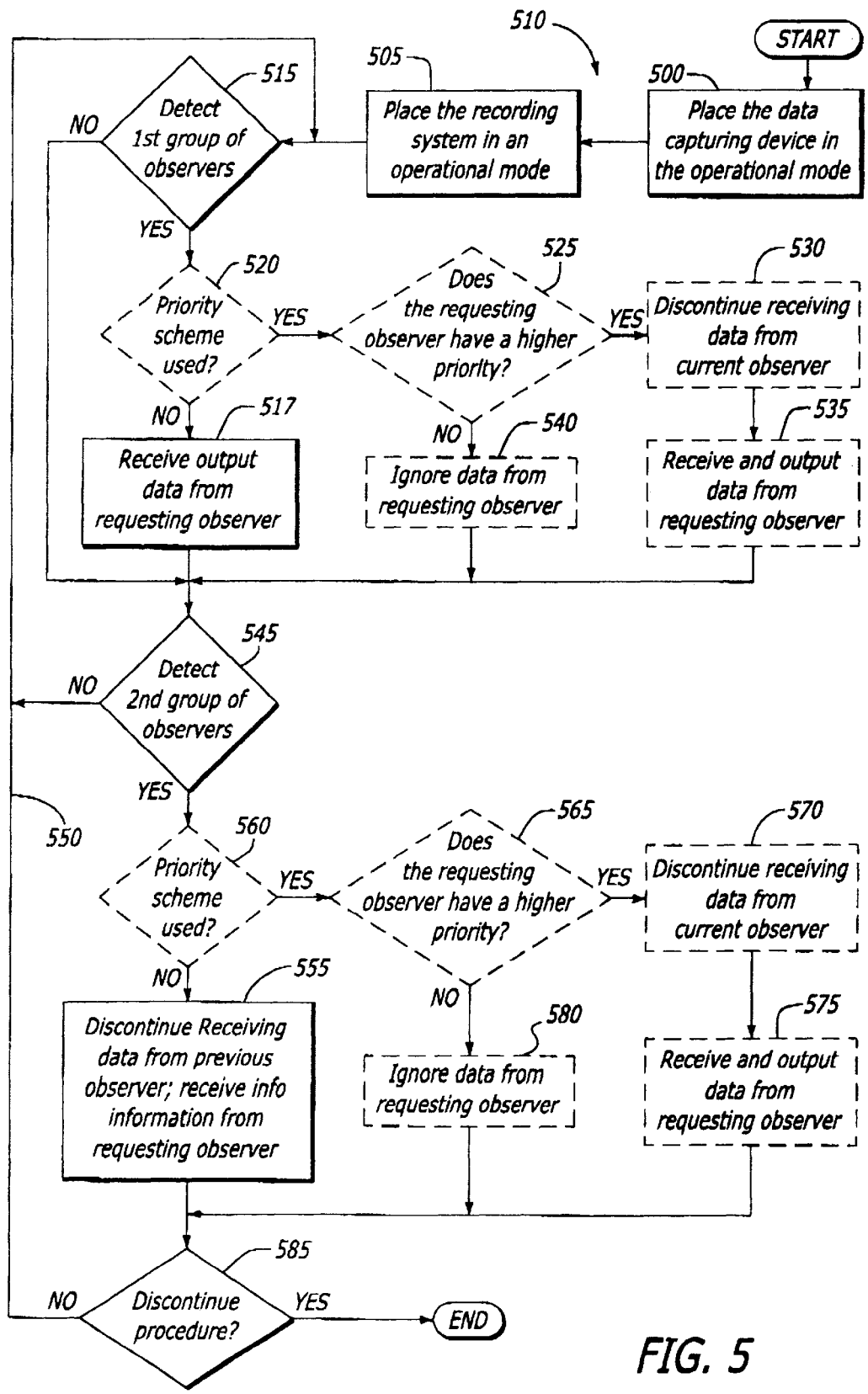
FIG. 5 is an illustrative embodiment of a flowchart featuring the operations of the recording system of FIGS. 1 and 2.

Referring now to FIG. 5, a flowchart illustrative of the operations of the recording system is shown. Initially, the data capturing device(s) and the recording system are placed in an operational mode (blocks 500 and 505). During observation of the event, multiple observers are able to provide comments in alphanumeric text for recordation with contemporaneous video of the event (block 510). For example, the recording system waits to receive an access request signal from an input device indicating that an observer of a first group wishes to provide comments on the event (block 515). This access request signal may be based on a selected key depression on an input device. Thereafter, information from an observer is received and output for storage in the recording system (block 517).

As an option, if the first group includes two or more observers, it may be desirable to employ a priority scheme (block 520). More specifically, the macro program utilizes a priority scheme if another subsequent observer issues an access request as comments concerning the event are being provided by a current observer. If the subsequent requesting observer is assigned a lower priority than the current observer, information from the requesting observer is ignored (blocks 525 and 540). If the requesting observer is assigned a higher priority than the current observer or no observer is providing comments, the macro program signals the computer to run a particular application to receive and subsequently output the incoming alphanumeric text along with the contemporaneous video (blocks 530 and 535). Normally, as mentioned above, the alphanumeric text may include all relevant content and process comments as described above.

Since the recording system allows multiple observers to provide comments in alphanumeric text for recordation with contemporary video, it should be configured to distinguish access request signals from an input device controlled by different groups of observers. If an observer of a second group wishes to provide comments on the event, he or she issues an access request signal to the computer (block 545). This access request signal may be based on a different key pattern than the keys depressed to create the access request for the first group. Otherwise, the recording system waits for further access request signals from observers of the first or second group (550).

In one embodiment, the detection of a request by an observer of the second group for access to the computer would cause the system to discontinue receiving information from any prior observer in favor of the subsequent requesting observer (block 555). In another embodiment, a priority scheme is followed in which the priority level of the current observer is compared to the priority level of the requesting, second group observer (block 560). If the priority level of the requesting, second group observer is greater than or equal to the priority level of the current observer, the macro program signals the computer to run a particular application to receive and output incoming alphanumeric text from the requesting observer along with the contemporary video (blocks 565, 570 and 575). Otherwise, if the requesting observer has a lower priority than the current observer, information from the requesting observer is ignored (block 580).

Thereafter, a determination is made whether a condition has occurred to cause the procedure to discontinue (block 585). Examples of a condition include placing the computer in a non-operational mode, minimizing the window and the like. If no conditions have occurred that would cause the procedure to discontinue, the monitoring for access requests from observers of the first and second groups would continue.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A machine readable medium having embodied thereon a macro program processed by a computer to further develop performance related skills during a training session, comprising:

a first module to detect an access request signal from a first observer of the training session; and a second module to prevent a second observer, communicating comments related to the event prior to receiving the access request signal, from continuing to communicate the comments.

2. The machine readable medium of claim 1 further comprising:

a third module to ascertain a priority level of the first observer and the second observer.

3. The machine readable medium of claim 2, wherein the third module in communication with the second module to prevent the second observer from communicating comments when the priority level of the first observer is at least greater than the priority level of the second observer.

4. The machine readable medium of claim 2, wherein the third module is in communication with the second module in order to prevent the first observer from communicating comments when the priority level of the second observer is at least greater than the priority level of the first observer.

5. The machine readable medium of claim 2, wherein the third module is in communication with the second module in order to prevent the first observer from communicating comments when the priority level of the second observer is equal to the priority level of the first observer.

6. A method for performance related skill development during an event including an instructor and a trainee, comprising:

providing captured video related to the event to a recording system;

providing alphanumeric text input by a plurality of observers of the event based on a selected priority scheme; and recording both (i) the captured video and (ii) alphanumeric text contemporaneously with the captured video on a medium in a format to provide the trainee real-time feedback for enhancing skill development through viewing of both the captured video and alphanumeric text collectively without a need for the instructor.

7. The method of claim 6, wherein the video includes both visual images and audio associated with the event.

8. The method of claim 6, wherein the alphanumeric text includes feedback regarding verbal conduct by the trainee.

9. The method of claim 6, wherein the alphanumeric text includes feedback regarding non-verbal conduct by the trainee.

10. The method of claim 6, wherein the alphanumeric text includes diagnostic opinions from an observer of the event.

11. The method of claim 6, wherein the recording of the captured video and the alphanumeric text includes storing the video and text on a selected medium.

* * * * *